(12) United States Patent
Einloft-Velte et al.

(10) Patent No.: US 10,647,013 B2
(45) Date of Patent: May 12, 2020

(54) PROVIDING A CUTTING AREA WITH WEB-LIKE INTERLEAVER MATERIAL

(71) Applicant: Weber Maschinenbau GmbH Breidenbach, Breidenbach (DE)

(72) Inventors: Tobias Einloft-Velte, Dautphetal (DE); Thomas Nispel, Dautphetal (DE); Noël Ritzen, Siegen (DE)

(73) Assignee: Weber Maschinenbau GmbH Breidenbach (DE)

(*) Notice: Subject to any disclaimer, the term of this patent is extended or adjusted under 35 U.S.C. 154(b) by 15 days.

(21) Appl. No.: 16/025,612

(22) Filed: Jul. 2, 2018

(65) Prior Publication Data

US 2019/0022885 A1    Jan. 24, 2019

(30) Foreign Application Priority Data

Jul. 3, 2017    (DE) .......................... 10 2017 114 761
Aug. 18, 2017  (DE) .......................... 10 2017 118 934

(51) Int. Cl.
*B26D 1/56*     (2006.01)
*B26D 7/32*     (2006.01)
(Continued)

(52) U.S. Cl.
CPC ............. *B26D 1/565* (2013.01); *B23D 33/04* (2013.01); *B26D 7/32* (2013.01); *B65H 20/32* (2013.01);
(Continued)

(58) Field of Classification Search
CPC ...... B26D 1/565; B26D 7/32; B26D 2210/02; B23D 33/04; B65H 39/16;
(Continued)

(56) References Cited

U.S. PATENT DOCUMENTS 3,675,387 A * 7/1972 Lekan .................... B65B 25/08
                                                    53/157
3,772,040 A * 11/1973 Benson .................. B65B 25/08
                                                    426/420
(Continued)

FOREIGN PATENT DOCUMENTS

DE    3431177 A1    8/1986
DE    8237311 U1    8/1986
(Continued)

OTHER PUBLICATIONS

Official Communication from the German Patent and Trademark Office for related German Patent Application No. 102017118934.4; 2 pages; dated: Jul. 25, 2018.
(Continued)

*Primary Examiner* — Sean M Michalski
(74) *Attorney, Agent, or Firm* — Dickinson Wright PLLC

(57) ABSTRACT

The invention relates to an apparatus for a single-track or multitrack provision of web-like interleaved sheet material at a cutting region in which products supplied on one track or on multiple tracks are cut into slices and interleaved sheets are introduced which are cut off from the provided interleaved sheet material in the cutting region, having a material store; and having a removal device which is configured for a removal of a material web from the material store, wherein a loop store in which the material web forms a loop is provided for the material web.

20 Claims, 5 Drawing Sheets

Figure 1:
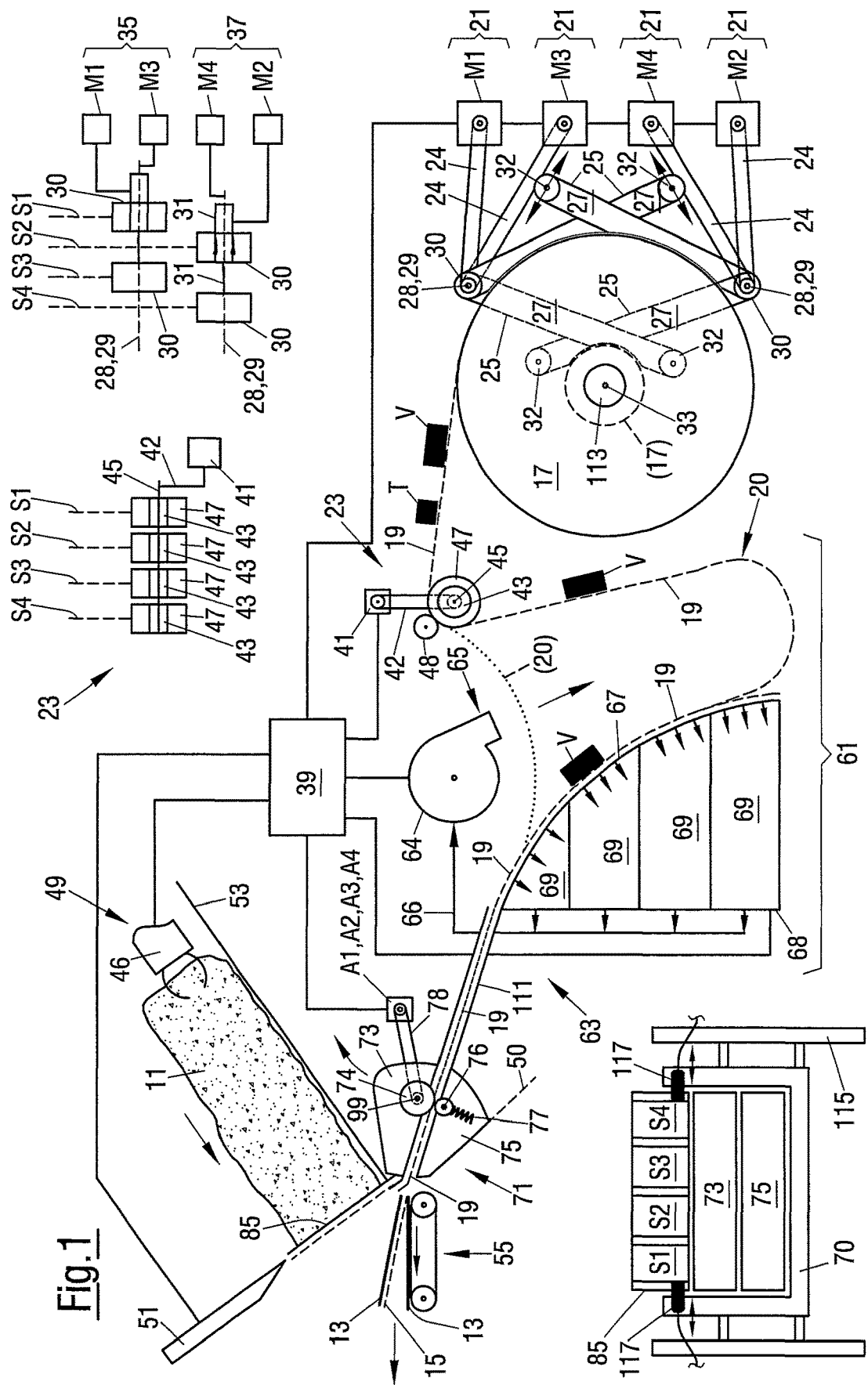

(51) Int. Cl.
  *B65H 39/16* (2006.01)
  *B23D 33/04* (2006.01)
  *B65H 20/32* (2006.01)
(52) U.S. Cl.
  CPC ......... *B65H 39/16* (2013.01); *B26D 2210/02* (2013.01); *B65H 2301/412845* (2013.01); *B65H 2403/7253* (2013.01); *B65H 2408/215* (2013.01); *B65H 2408/217* (2013.01)
(58) Field of Classification Search
  CPC ........... B65H 2403/7253; B65H 2301/412845; B65H 2408/217; B65H 20/32; B65H 2408/215
  See application file for complete search history.

(56) References Cited

U.S. PATENT DOCUMENTS

| | | | | |
|---|---|---|---|---|
| 3,787,001 | A * | 1/1974 | Henry | B65B 9/213 242/417.2 |
| 3,848,757 | A | 11/1974 | Jordan | |
| 4,116,399 | A * | 9/1978 | Mosburger | B65H 19/1852 156/504 |
| 4,176,000 | A * | 11/1979 | Achelpohl | B29C 65/18 156/510 |
| 4,944,467 | A * | 7/1990 | Snygg | B65H 23/06 242/422.9 |
| 5,117,717 | A * | 6/1992 | Mally | B26D 5/20 53/157 |
| 5,137,225 | A * | 8/1992 | Biagiotti | B65H 19/2269 242/521 |
| 5,979,308 | A * | 11/1999 | Kagi | B41F 19/068 101/27 |
| 7,189,308 | B2 * | 3/2007 | Feit | D21H 27/10 162/135 |
| 7,424,903 | B2 * | 9/2008 | Kagi | B41F 19/068 156/459 |
| 7,601,375 | B2 * | 10/2009 | Langton | B65D 57/00 426/106 |
| 2002/0179767 | A1 | 12/2002 | Rapparini | |
| 2008/0250944 | A1 * | 10/2008 | Pryor | B26D 7/27 99/537 |
| 2012/0073249 | A1 * | 3/2012 | Pryor | B26D 7/325 53/514 |
| 2016/0272440 | A1 * | 9/2016 | Mayer | B65G 15/50 |
| 2016/0286852 | A1 * | 10/2016 | Gindrat | B65H 19/1852 |
| 2016/0316770 | A1 * | 11/2016 | van Blokland | A21C 14/00 |
| 2016/0346951 | A1 * | 12/2016 | Horberg | B26D 7/325 |
| 2017/0165712 | A1 * | 6/2017 | Fischer | B29D 7/01 |
| 2017/0165858 | A1 * | 6/2017 | Bochtler | B26D 1/0006 |
| 2017/0259448 | A1 * | 9/2017 | Weber | B26D 7/0625 |
| 2017/0266831 | A1 * | 9/2017 | Wachter | B26D 9/00 |
| 2017/0368707 | A1 * | 12/2017 | Keller | B26D 7/01 |
| 2018/0111283 | A1 * | 4/2018 | Klockow | B26D 7/0641 |
| 2018/0169888 | A1 * | 6/2018 | Weber | B26D 7/32 |
| 2019/0022885 | A1 * | 1/2019 | Einloft-Velte | B26D 1/565 |
| 2019/0022886 | A1 * | 1/2019 | Einloft-Velte | B26D 1/565 |
| 2019/0023518 | A1 * | 1/2019 | Gerhardt | B65H 35/08 |
| 2019/0030743 | A1 * | 1/2019 | Einloft-Velte | B26D 7/325 |
| 2019/0047168 | A1 * | 2/2019 | Bialy | A22C 17/0093 |
| 2019/0152084 | A1 * | 5/2019 | Schmeiser | B26D 5/007 |
| 2019/0152085 | A1 * | 5/2019 | Reisz | B65H 16/021 |
| 2019/0232512 | A1 * | 8/2019 | Votava | B26D 1/245 |
| 2019/0232513 | A1 * | 8/2019 | Erne | B26D 7/0616 |

FOREIGN PATENT DOCUMENTS

| | | |
|---|---|---|
| DE | 4125539 A1 | 2/1993 |
| DE | 102013204956 A1 | 9/2014 |
| EP | 1940685 A2 | 7/2008 |
| EP | 2848380 A1 | 3/2015 |
| WO | 2012024673 A2 | 2/2012 |
| WO | 2016166286 A1 | 10/2016 |

OTHER PUBLICATIONS

Communication received from the European Patent Office from related European Patent Application No. 18181289.2; dated: Nov. 15, 2018; 7 pages.

* cited by examiner

PROVIDING A CUTTING AREA WITH WEB-LIKE INTERLEAVER MATERIAL

CROSS-REFERENCES TO RELATED APPLICATIONS

This application claims the priority of German Application No. 102017114761.6 filed on Jul. 3, 2017 and German Application No. 102017118934.3 filed on Aug. 18, 2017, each of which is incorporated herein by reference, in their entirety.

The invention relates to an apparatus for a single-track or multitrack provision of web-like interleaved sheet material at a cutting region in which supplied products are cut into slices and interleaved sheets are introduced which are cut off from the provided interleaved sheet material in the cutting region.

In the cutting region, slices cut off from the products can consequently be provided with the interleaved sheets introduced into the cutting region. In this respect, either interleaved sheets can e.g. be introduced between a respective two directly consecutive slices or interleaved sheets can be introduced beneath a respective slice and thus between this slice and a support surface of this slice. A respective interleaved sheet is then, for example, located beneath the lowest slice of a portion on the formation of portions from a plurality of slices. Such a function which is also called an underleaver function, however, does not preclude that, on the formation of portions, a respective interleaved sheet is not only disposed beneath the lowest slice, but one or more interleaved sheets are also introduced between a respective two consecutive slices within the portion. Independently of whether an underleaver function is provided or not, a respective interleaved sheet can generally be introduced within a portion either between each pair of directly consecutive slices or only between one or more pairs of directly consecutive slices, e.g. between every nth pair, where n>1.

Such apparatus are generally known in the field of the slicing of food products and are also called interleavers or underleavers. An interleaver can in this respect—as mentioned above—also perform an underleaver function and vice versa. The present disclosure therefore not only applies to the interleavers primarily explained here or to the provision of interleaved sheets or interleaved sheet material between a respective two directly consecutive slices, but also to so-called underleavers which serve to place a sheet beneath products. It is ensured by such an underleaved sheet feed that at least the total lower side of the products does not directly lie on a support surface, for example, on a conveying device. When only the term "interleaver" is used in each case in the following, the respective statements and the respective disclosure—where sensible—will also apply to an "underleaver". As already mentioned, one and the same apparatus for the provision of interleaved sheet material or of interleaved sheets can perform both an interleaver function and an underleaver function in dependence on the respective application, i.e. an interleaver is simultaneously also an underleaver, and vice versa, within the framework of this disclosure.

The invention also relates to an apparatus for slicing food products, having a product feed which supplies products to be sliced to a cutting region in which a cutting blade moves in a rotating and/or revolving manner to cut the supplied products into slices; and having an interleaver or underleaver in accordance with the invention.

Such cutting apparatus are also called slicers or high-speed slicers, the latter against the background that bar-like or loaf-like food products can e.g. be sliced by such machines at high cutting speeds of several hundred to some thousand slices per minute. In many applications, stacked or overlapping portions are, for example, formed from the cut-off slices falling onto a support surface e.g. formed by a portioning belt. An interleaver, for example, serves to introduce interleaved sheets between directly consecutive slices of a portion so that the slices can later be separated from one another more easily. Paper or a plastic film, for example, serves as the material for the interleaved sheets.

In accordance with the progress in the development of cutting machines, in particular with respect to speed, accuracy and variety, ever higher demands are also made on the interleavers or underleavers. Known interleaver or underleaver concepts which generally provide satisfactory results frequently no longer meet these increased demands.

There is consequently a need for an improved interleaver or underleaver technology in particular in the field of the slicing of food products by means of high-speed slicers. In particular the operation of interleavers and underleavers on multiple tracks and individually per track is more and more in the foreground.

It is a problem with the known interleavers or underleavers that the ejection of the material web into the cutting region is a highly dynamic process which is the more difficult to manage, the greater the cutting speed is. The required decoupling between this highly dynamic process, on the one hand, and the sluggish material store from which the material web is removed, on the other hand, therefore has to be able to provide a sufficiently large web length at all times so that it is ensured that the material web does not have to be removed from a sluggish material store, such as a material roll, at any point in time.

It is the object of the invention to improve an apparatus for the provision of web-like interleaved sheet material to the extent that the process of the ejection of the material web into the cutting region is also reliably decoupled from the process of the removal of the material web from the material store at comparatively high cutting speeds.

The object is satisfied by the features of the independent claims.

The apparatus in accordance with the invention is configured for a single-track or multitrack provision of web-like interleaved sheet material and comprises a material store as well as a removal device which is configured for a removal of a material web from the material store, wherein a loop store in which the material web forms a loop is provided for the material web.

The material loop so-to-say forms a non-sluggish, dynamic material store from which the web length respectively required in the cutting region can be removed practically without a delay. It is hereby advantageously avoided that strains occur in the material web on the acceleration of the material web.

In accordance with a preferred embodiment, the loop store comprises a brake for the material web. It is hereby ensured that the material web is tensioned at all times.

Provision can furthermore be made that the loop store comprises a suction device for the material loop. The material web can hereby be influenced in a simple and effective manner to ensure a desired web extent within the loop store.

The suction device can furthermore serve to exert a braking effect on the material web.

In accordance with a further embodiment, the loop store comprises a blowing device for the material loop. The extent of the material web in the loop store can likewise be directly influenced by a blowing device or a respective loop formation can thereby be assisted.

Provision is preferably made that the suction device acts on an outer side of the material loop and the blowing device acts on an inner side of the material loop. The action on the material web can also take place in reverse order in dependence on a respective desired extent of the material web in the loop store.

Provision can furthermore be made that the material web forms more than one material loop in the loop store. A respective desired loop formation can be implemented or assisted by more than one suction device and/or by more than one blowing device.

A suction device and a blowing device can belong to a common air circuit. The influencing of the material web within the loop store can hereby be implemented in a particularly simple and effective manner.

The air circuit, in particular the strength and/or the direction of an air flow, can be settable and/or controllable by an internal or external control device in dependence on the loop size.

A fan is preferably provided whose suction side belongs to a suction device and whose pressure side belongs to a blowing device.

If the apparatus is of multitrack design, a fan be provided in accordance with an embodiment which acts individually per track and which can provide an individually settable suction effect and pressure effect for each of the material webs running in the individual tracks.

Provision can furthermore be made that the loop store comprises a contact surface for at least one region of the material loop at the outgoing side. The contact surface can guide the material web on its way out of the loop store.

Provision can furthermore be made that the contact surface belongs to a brake for the material web.

The contact surface is preferably air permeable, wherein the contact surface bounds at least one vacuum chamber to which a suction device is connected or which belongs to a suction device. The air permeable contact surface can e.g. simply be a perforated metal sheet.

If the apparatus is of multitrack design, the arrangement of the contact surface and the vacuum chamber can be of multitrack design in accordance with an embodiment. An individually settable braking effect can hereby in particular be set for each of the material webs running in the individual tracks.

In accordance with an embodiment, the contact surface is convexly curved, wherein the contact surface in particular has an arcuate contour.

A wrapping around of the contact surface by the material web results from such a formation of the contact surface. This is in particular advantageous when the contact surface acts as a brake for the material web in that the contact surface which is, for example, provided with openings e.g. bounds a vacuum chamber. It is of advantage in this respect that the material web can at least approximately extend tangentially to the curved contact surface in the region of the transition toward the contact surface and/or in the region of the transition away from the contact surface. Such a web extent in the region of a contact surface active as a brake has been found to be particularly advantageous.

Provision can furthermore be made that a braking effect of the contact surface for the material web is settable and/or controllable by means of a suction device, by means of a blowing device or by means of an air circuit, preferably comprising a suction device and a blowing device, in particular via an air flow and/or via an air volume flow.

Provision can be made in accordance with a further embodiment to provide a secondary air apparatus, which is in particular settable, at the suction side—that is e.g. at the suction side of a fan or in a vacuum chamber. The braking effect of the contact surface can hereby be homogenized. It is possible to avoid too large a braking effect on the material web by using a secondary air apparatus which can be configured as a flap or as a membrane, for example. A relatively high braking effect can in particular occur without a secondary air apparatus when the loop of the material web is comparatively large such that a relatively large portion of the contact surface is covered by the material web and e.g. a relatively large number of openings formed in the contact surface are closed by the material web.

In accordance with an embodiment of the invention, a device is provided which is configured to determine a measure for the loop size, in particular for the lower position and/or upper position of the loop. The position of the apex or of a region of the loop comprising the apex can be defined as the position of the loop.

An internal or external control apparatus can furthermore be provided which is configured to control the web length entering the loop store per time unit in dependence on the loop size.

The removal device which serves to remove the material web from the material store can be controllable by the control device in dependence on the loop size.

The removal device can be controllable such that the removal of the material web is started on reaching a predefined minimal loop size and is ended on reaching a predefined maximum loop size. A regulation of comparatively simple design can hereby be implemented.

In accordance with a further embodiment, the removal device can be controllable such that the web length entering the loop store per time unit is continuously variable, in particular in a ramp-like manner, in dependence on the loop size.

The reaching of a predefined minimal loop size and/or the reaching of a predefined maximum loop size can be provided as a measure for the loop size. Such a concept can be implemented in a comparatively simple manner since only two extreme values have to be detected for the loop size. The minimal loop size can be defined by a predefined or predefinable upper position of the loop. The maximum loop size can be defined by a predefined or predefinable lower position of the loop.

Provision can be made in an embodiment that a speed of the material web entering the loop store is calculated, which speed is adapted to the respective operating situation and is accordingly changed on the occurrence of predefined conditions. The speed of the material web can thus e.g. be correspondingly increased or decreased on reaching a predefined minimal loop size and on reaching a predefined maximum loop size.

In accordance with a further embodiment, the varying influence of the material loop on a suction device can be provided as a measure for the loop size. A suction device which is anyway provided can in this respect additionally be used to influence the material web in order to obtain information on the current loop size. Openings formed in a contact surface disposed in the flow path of the suction device can, for example, result in changes in the pressure conditions and/or flow conditions which are to be detected and which occur when the loop size and consequently the number of openings closed by the material web change.

The result of a vacuum measurement in one or more vacuum chambers can preferably be provided as a measure for the loop size.

Alternatively or additionally, a local vacuum measurement can provide a measure for the loop size, in which vacuum measurement the pressure in the vacuum chamber or vacuum chambers does not need to be measured, but it is rather sufficient to measure the local pressure in a volume, in particular in a much smaller volume, e.g. in a region behind the contact surface. A plurality of such volumes that are arranged at different positions, which e.g. differ with respect to height and represent different loop sizes, can be provided for local pressure measurements.

The varying influence of the material loop on an air permeable contact surface can furthermore be provided as a measure for the loop size.

In particular if the apparatus is of multitrack design, a plurality of vacuum chambers or a vacuum chamber divided into a plurality of individual chambers can be provided, wherein the chambers are bounded by a contact surface for the material web or for the material webs. A differentiated, spatially resolved image of the cover of the support surface can be obtained by vacuum measurements which take place in the individual chambers. In particular in a multitrack operation, the loop sizes can hereby be determined individually per track when the chambers are arranged and/or aligned in a corresponding track-specific manner.

In accordance with a further embodiment of the invention, the result of a position determination of the material loop is provided as a measure for the loop size.

In general and independently of the specific measurement method, the loop size can be determined by determining the position of the loop in the loop store. For example, the position of the lower loop end, i.e. of the apex of the loop, is a measure for the loop size when a loop hangs in the loop store. If the loop increases in size and a sensor arranged in the loop store at a specific height, which e.g. corresponds to a predefined maximum loop size, detects the presence of the lower loop end at this height for the first time at a specific point in time, the loop has reached its predefined maximum size at this point in time. A plurality of sensors can be arranged at different heights. However, this is not compulsory. A sensor which is active at that height which corresponds to the predefined maximum loop size is sufficient to recognize the reaching of the maximum loop size and e.g. to communicate it to a control.

The invention also relates to an apparatus and to a method for the single-track or multitrack provision of web-like interleaved sheet material at a cutting region in which products supplied on one track or on multiple tracks are cut into slices and interleaved sheets are introduced which are cut off from the provided interleaved sheet material in the cutting region, wherein at least one material web which forms a loop in a loop store is removed from at least one material store; wherein at least one sensor for detecting the loop, in particular the lower loop end, and means for moving the material web toward a contact surface are provided, at least one part of the sensor being integrated into said contact surface; and wherein the sensor is configured such that the loop is only detected when the material web contacts the contact surface in the region of the part of the sensor integrated into the contact surface.

The integration of the sensor or of a part of the sensor into the contact surface also comprises an arrangement of the sensor or of the sensor part in the region of the contact surface, i.e. in a plane which does not coincide with the plane defined by the contact surface. In other words, the sensor or the sensor part can, in particular slightly, project or be set back with respect to the contact surface.

This concept represents an independent subject of the present disclosure for which protection is also claimed independently.

The mentioned sensor part is in particular a part of the sensor which is sensitive in the widest sense with respect to the material web and which responds to the presence of the material web. Different measurement principles can be used in this respect.

The sensor or the sensor part integrated into the contact surface is preferably arranged such that the loop is only recognized when the loop has reached a predefined maximum loop size.

The contact surface can bound a vacuum chamber, for example, in such a manner as is described in another passage of the present disclosure. In accordance with a possible measurement principle, the sensor can comprise a separate measurement space which is in particular relatively small in comparison with the vacuum chamber and to which a vacuum source, e.g. a vacuum pump, and a pressure measurement device are connected. A measurement opening can be provided in the contact surface as a part of the sensor which is integrated into the contact surface and it communicates with the measurement space of the sensor. The measurement opening can also be formed by the sensor itself. As soon as this opening is at least partly closed by the material web which is sucked in by means of the vacuum chamber and which is thereby moved toward the measurement opening, that is the material web contacts at least one part of the margin of the sensor bounding the opening or at least one part of the contact surface, the pressure within the measurement space acted on by the vacuum source drops. This change in pressure is detected by means of the measurement device and can be communicated to a control. The loop and in particular the reaching of a predefined maximum loop size to which the position of the measurement opening corresponds can be recognized in this manner.

Other positions of the loop, for example a predefined minimal loop size to which a sensor arranged at another position or its measurement opening corresponds, can alternatively or additionally also be recognized by a different position of the sensor or of the measurement opening or by further sensors.

An alternative measurement principle of a loop detector in accordance with a further embodiment of this aspect of the invention provides that the sensor or the mentioned sensor part responds to a contact with the material web. The sensor or the sensor part can e.g. be active capacitively, inductively, electromechanically and/or electrostatically. The sensor can in turn communicate the recognition of the loop to a control.

In a multitrack design, a loop detector can be provided for each material web, with the individual loop detectors being able to be operated independently of one another. A loop detection individually per track can hereby be implemented.

Independently of whether one or more such sensors or loop detectors are provided, the loop detector or the loop detectors is/are adjustable in the transverse direction to be able to be aligned with the respective track. The correct transverse position of a loop detector in particular depends on the width of the respective material web and on the number of tracks. The number of tracks of the interleaver or underleaver, and thus in the loop store, as well as the width of the material webs can vary in dependence on the respective application. Loop detectors adjustable in the transverse direction are therefore advantageous.

If a multitrack slicer is provided with an interleaver in accordance with the invention, a common control device is preferably provided which is configured to coordinate the slicing of the products and the provision of the interleaved sheet material individually per track.

Figure 2:
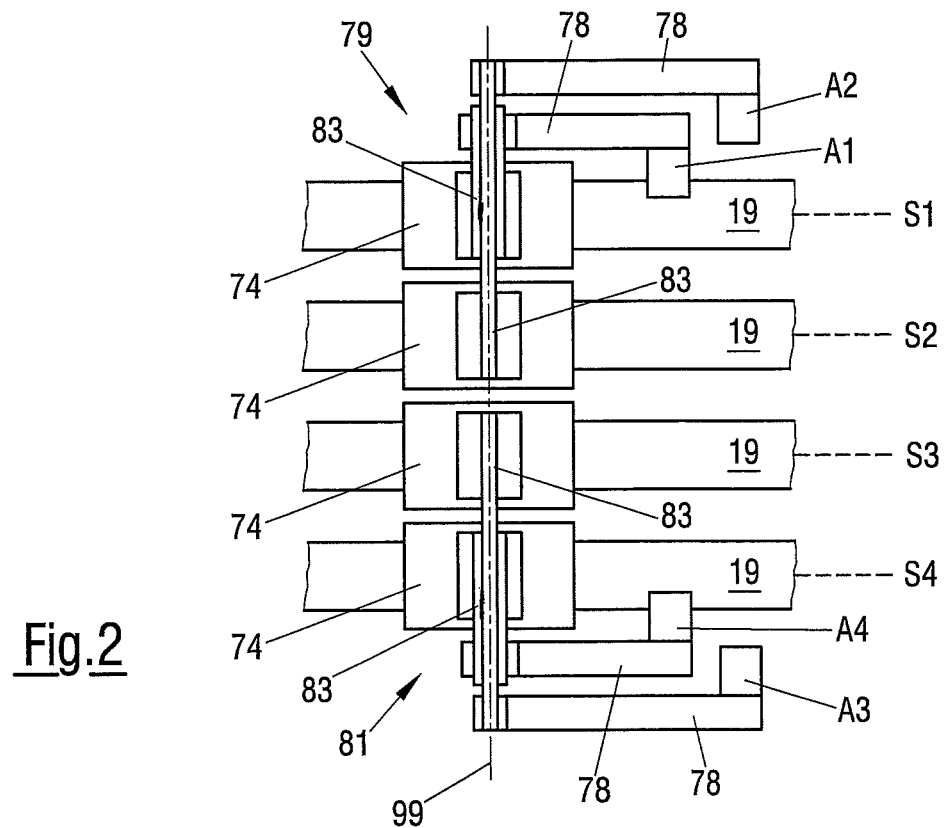
Figure 4:
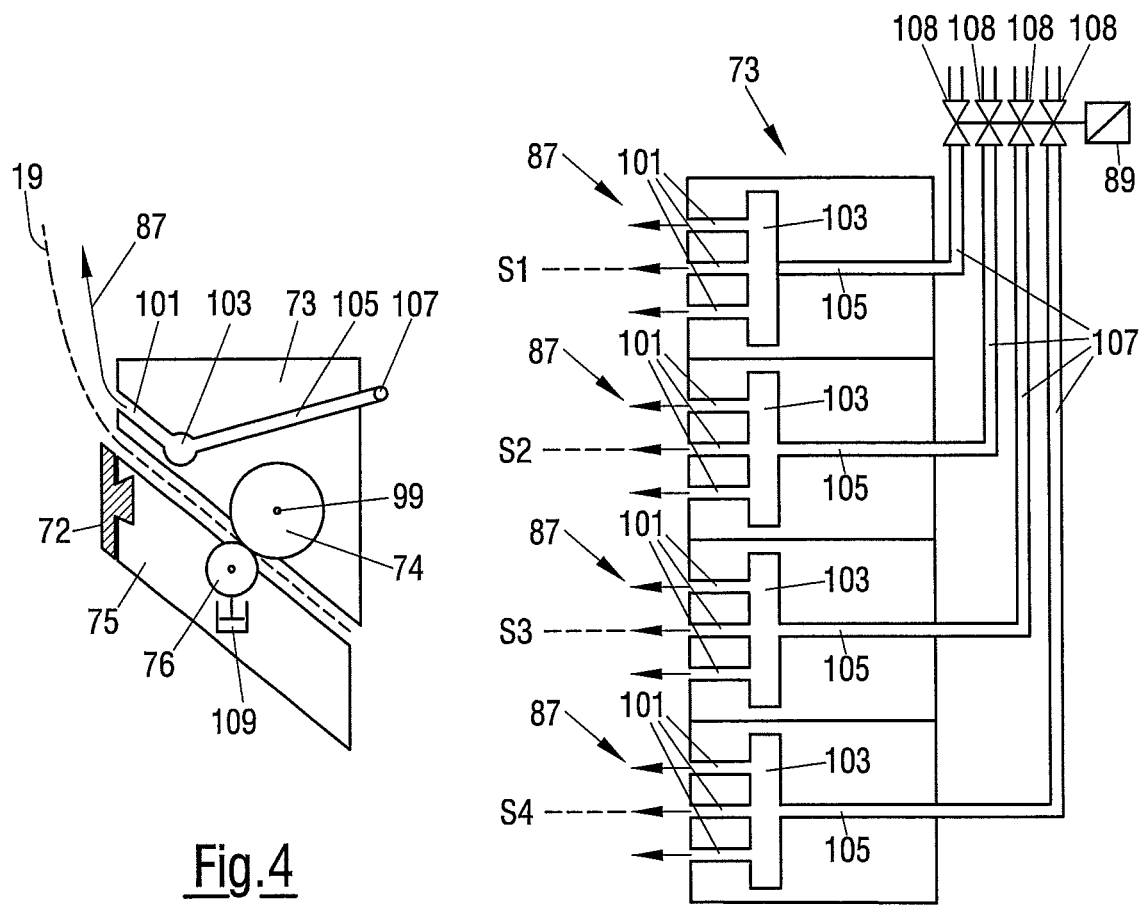
Figure 3:
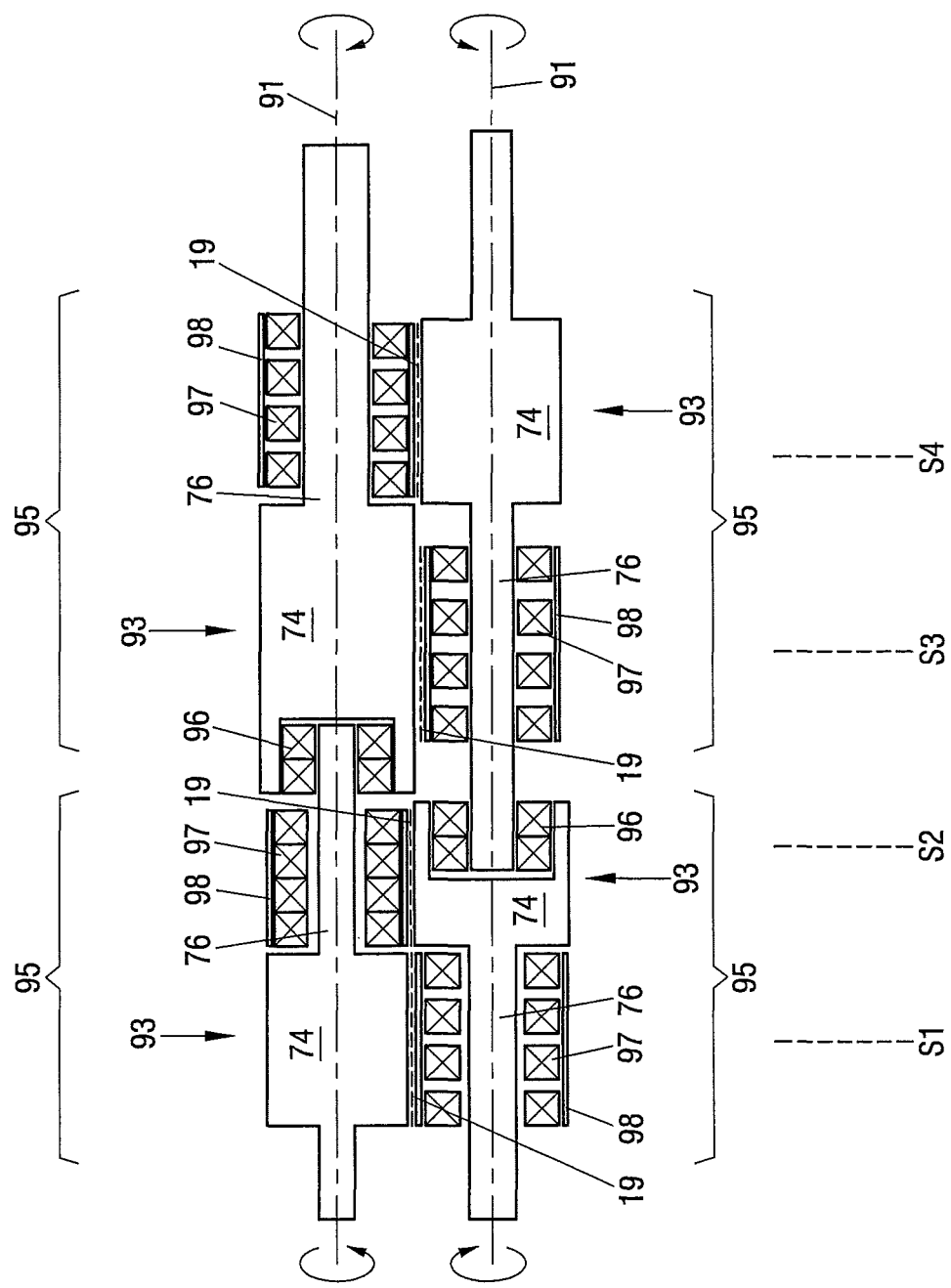
Figure 5:
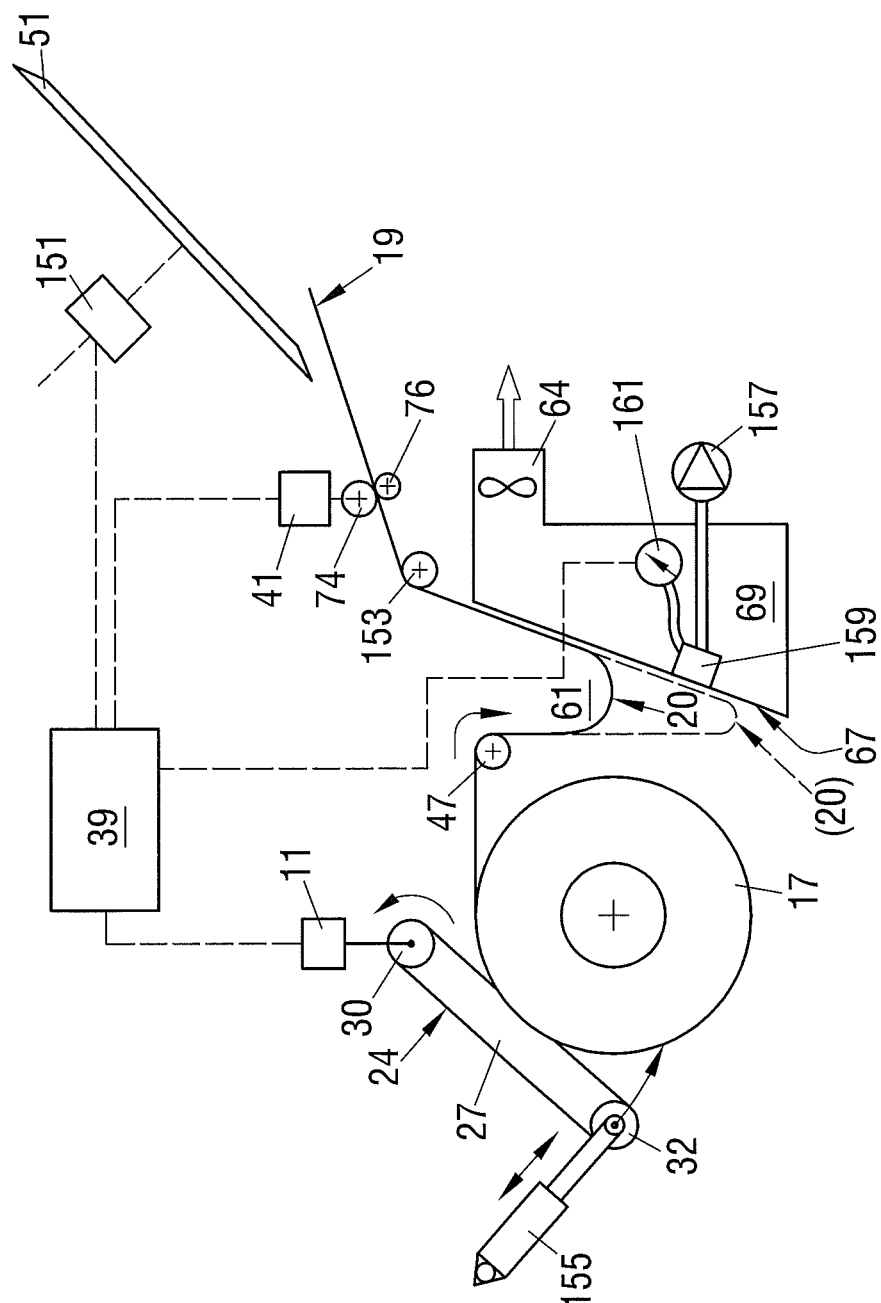
Figure 6:
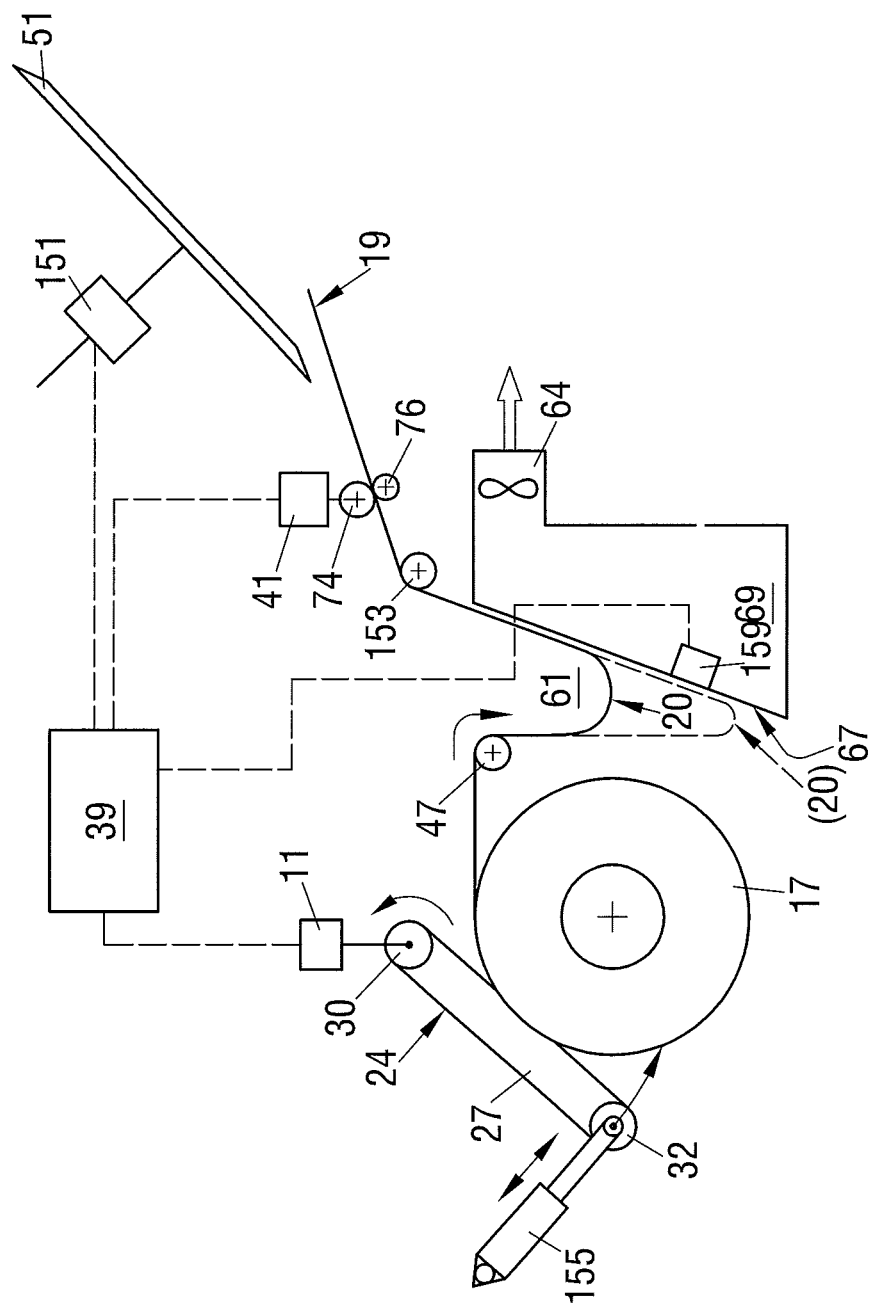

The invention will be described in the following by way of example with reference to the drawing. There are shown:

FIG. 1 schematically, a side view of a slicer with an interleaver in accordance with an embodiment of the invention and three individual representations shown schematically;

FIGS. 2-4 schematically in each case, an embodiment of a feed unit of an interleaver; and FIGS. 5 and 6 schematically in each case, in a side view simplified with respect to FIG. 1, a slicer with an interleaver/underleaver in accordance with a further embodiment of the invention.

The large representation in FIG. 1 shows a multitrack high-speed slicer, that is an apparatus for a multitrack slicing of food products such as sausage, meat or cheese, in a schematic side view which is not to scale.

In the embodiment shown, the slicer is operated on four tracks. Four products 11 to be sliced are disposed next to one another on a product support 53 inclined to the horizontal. A product feed 49 comprises for each track, that is for each of the four products 11, a product holder 46, also called a product gripper, which holds the product 11 at the rear end and supplies it in the supply direction indicated by the arrow to a cutting plane 50 which extends perpendicular to the product support 53 and in which a cutting blade 51 moves by whose cutting edge the cutting plane 50 is defined.

The cutting blade 51 can be a so-called scythe-like blade or spiral blade which has a cutting edge extending in a scythe-like form or spiral form and which only rotates about a blade axis, not shown. Alternatively, the cutting blade 51 can be a so-called circular blade which has a circular cutting edge, which rotates about its own blade axis and which additionally revolves in a planetary motion about an axis extending offset in parallel from the blade axis in order to produce the cutting movement relative to the products 11 required to cut off slices 13 from the products 11.

The product feed 49 can be operated individually per track, i.e. the product holders 46 can generally move independently of one another in the supply direction and thus supply the individual products 11 to the cutting plane 50 at different speeds and with different speed profiles. This also applies if product support belts which are drivable individually per track are used instead of a passive product support 53 as the product feed 49 instead of the product holders 46 or in addition to the product holders 46. The slicing process can hereby be individually controlled in each track independently of the respective other tracks, in particular with the aim of an exact weight production of slices 13 or portions formed from a respective plurality of slices 13 while taking into account the individual product properties such as in particular weight distribution and cross-sectional profile.

It is also possible to stop the product holder 46 in a track or to move it against the supply direction in order temporarily not to cut off any slices 13 from the respective product 11 while the products 11 continue to be sliced in the other tracks. The product feed 49 on individual tracks can also take into account the cutting movement of the cutting blade 51 which is characterized in that a respective slice 13 is indeed cut off from all the products 11 per cutting movement—that is per revolution or rotation of the cutting blade 51—but this does not take place at the exact same time, the cut-off slices 13 of the products 11 rather falling onto the support surface, formed by a so-called portioning belt 55 here, consecutively in time due to the passage of the cutting blade 51 through the products 11 which requires a specific duration of time.

For many products 11, for example ham or some types of cheese, it is desired for the respective slices 13 which are disposed above one another and, for example, form a stack-like portion or an overlapping portion to be separate from one another so that they can later be individually removed more easily by a consumer from a package including the portion. In the field of high-speed slicers, this purpose is served by so-called interleavers, that is apparatus for the provision of web-like interleaved sheet material, by means of which it is possible to introduce interleaved sheets 15 between directly consecutive slices 13.

There are interleavers in different designs. In accordance with a widespread mode of operation, which is also provided for the interleaver in accordance with the invention shown here, the endless material webs 19 are ejected in the region of the cutting plane 50 coming from below in accordance with the clocking predefined by the cutting movement of the cutting blade 51. This takes place such that the front end of the respective material web 19 is disposed in front of the cut surface of the respective product 11 and, together with the slice 13 which is cut off next, is cut off from the material web 19 by means of the cutting blade 51 and thus forms an interleaved sheet 15. This interleaved sheet comes to lie on the portioning belt 55 or on the previously cut-off slice 13 and beneath that slice 13 with which the interleaved sheet 15 was previously cut off together.

The design and the mode of operation of such slicers and also the basic principle of an interleaver are sufficiently known to the skilled person so that it is not necessary to look at them in any more detail in the following.

The interleaver in accordance with the invention which is integrated into the slicer is of multitrack design and is configured to continuously provide the interleaved sheet material on individual tracks. The design and the mode of operation of the interleaver will be explained in the following using the example of a four-track operation. The interleaver in accordance with the invention can, however, also be operated on one track, on two tracks or on three tracks by a comparatively simple conversion. The respective operating mode is, for example, dependent on the products to be sliced, on the conveying and sorting devices connected downstream and on the type of packaging or on the packaging machine. The interleaver in accordance with the invention is generally designed such that an operation with any desired number of tracks and consequently also with more than four tracks is possible.

For each of the four tracks S1, S2, S3 and S4, the provision of the interleaved sheet material comprises the removal of the material from a material store formed by a material roll 17, the storage of material in a loop store 61, the guidance of the material in a region between the loop store 61 and an output device 71, and the outputting of the material by means of the output device 71.

For each track, the removal of the material web 19 from the material roll 17 comprises the rolling off of the material web 19 by means of a roll-off drive 21 and the conveying of the material web 19 into the loop store 61 by means of a conveying device 23 common to all the tracks. The individual roll-off drives 21 and the common conveying device 23 form a removal device of the interleaver in accordance with the invention.

For each track, the storage of the material web 19 takes place by the formation of a material loop 20 in the loop store

61. The individual material webs 19 or loops 20 are laterally guided by dividing walls (not shown) in the loop store 61 to ensure the accuracy of the material webs 19 on the tracks.

In the embodiment shown, the total transport path for the material web 19 between the loop store 61 and the output device 71 is formed by a shaft 111 in which the individual material webs 19 are guided. Such a design is indeed possible in practice. However, further devices which will not be looked at in any more detail at this point are preferably provided between the loop store 61 and the output device 71 in addition to a purely guidance section such as is formed by the shaft 111 in FIG. 1.

The outputting of the individual material webs 19 respectively comprises the removal of the material web 19 from the loop store 61 and the ejection of the material web 19 into the cutting region, that is before the cut surface of the respective product 11, as explained above. The material web 19 is pulled from the loop store 61 on the removal. The material web 19 is in this respect simultaneously advanced into the cutting region and is thus ejected.

These individual regions of the interleaver in accordance with the invention, that is the removal device comprising the individual roll-off drives 21 and the common conveying device 23, the loop store 61 and the output device 71, will be described in more detail in the following. If not otherwise stated, the respective description of the function and design applies to each of the individual tracks.

The interplay of these individual functional units of the interleaver with one another and also the interplay of the interleaver with the functional units of the slicer, in particular—but not exclusively—with the cutting blade 51 and with the product feed 49, is controlled by a control device 39 which can be the central control device of the slicer and thus a control device which is external with respect to the interleaver. Alternatively, the interleaver can have an internal control device which cooperates with a control device of the slicer.

Furthermore, the interleaver can additionally receive external signals e.g. from a camera system which monitors the portions produced by means of the slicer or the portion formation from the cut-off slices.

The material rolls 17 of the individual tracks are rotatably supported about a common axis of rotation 33 defined by a common mandrel. Each material roll 17 comprises a roll core 113 at which the material web 19 is wound. The material rolls 17 are freely rotatable at the mandrel to the extent that the rotational drive for the material rolls 17 for the rolling off of the material webs 19 does not takes place via this common mandrel.

Instead, a separate roll-off drive 21 is provided for each material roll 17. Each roll-off drive 21 comprises a drive arm 27 pivotable about a pivot axis 28. Each drive arm 27 comprises a support, not shown, to whose one end a drive roller 30 is attached and to whose other end a deflection roller 32 is attached. An endless belt 25 revolving around the drive roller 30 and the deflection roller 32 serves as a drive member for the material roll 17; it is configured as a friction belt and serves to cooperate in a force-transmitting manner with the wound material web 19 of the material roll 17 via the turn facing the material roll 17.

As is also shown in the schematic representation at the top right in FIG. 1, each drive roller 30 is rotationally fixedly connected to a drive shaft 31 which can be set into rotation by means of a drive motor M via a drive belt 24 in order to drive the friction belt 25 and to roll the material web 19 off from the material roll 17 in this manner.

Since the four tracks S1, S2, S3 and S4 of the interleaver extend in parallel and four material rolls 17 are thus also seated next to one another on the common mandrel, the four drive arms 27 are accordingly arranged offset from one another in the transverse direction. This is indicated in the schematic representation at the top right in FIG. 1 by the association of the tracks S1 to S4 with the individual drive rollers 30 of the drive arms 27.

The spatial arrangement of the drive arms 27 and the manner of the rotational drive for the drive rollers 30 are particularly advantageous. The axes of rotation 29 of the drive shafts 31 and thus of the drive rollers 30 each coincide with the pivot axis 28 of the respective drive arm 27. In this respect, a single common pivot axis 28 is not provided for all the drive arms 27. Instead, the drive arms 27 are combined pair-wise, wherein a common pivot axis is provided for each pair. Two drive arms 27 pivotable about an upper pivot axis 28 are in this respect associated with the tracks S1 and S3, whereas two drive arms 27 which are pivotable about an lower pivot axis 28 are associated with the tracks S2 and S4.

In the embodiment shown, all the drive arms 27 have the same length and the upper pivot axis 28 and the lower pivot axis 28 are disposed at a circular cylinder about the common axis of rotation 33 of the material rolls 17. Alternatively, the drive arms 27 can be of different lengths and the pivot axes 28 can be arranged in a different manner.

A respective coaxial shaft drive 35 or 37 is provided for both the upper pair of drive arms 27 and the lower pair of drive arms 27. The two drive motors M1 and M3 belong to the upper coaxial shaft drive 35, whereas the lower coaxial shaft drive 37 comprises the two drive motors M4 and M2. A motor M3 or M4 respectively is connected to an inner drive shaft 31 for the drive roller 30 which is disposed further away axially, whereas the respective other motor M1 or M2 is connected to a hollow shaft 31 which surrounds the inner drive shaft 31 and on which the more closely disposed drive roller 30 is seated.

As already mentioned, the drive motors M1 to M4 are not directly connected to the drive shafts 31, but rather via drive belts 24. This enables a displaced or an offset positioning of the motors and consequently an ideal use of the space available in the interleaver. Furthermore, the interleaver can hereby be designed comparatively narrow since the motors M1 to M4 respectively do not need to be positioned in the axial extension of the drive shafts 31.

A further advantage of this drive concept comprises all of the motors M1 to M4, including the drive belts 24, only being arranged at one side of the interleaver. This region is therefore more easily accessible via the other side of the interleaver. It is particularly advantageous that all the drive rollers 30, and thus the drive arms 27, can be plugged onto the respective drive shaft 31 and can be removed from it from the same side—namely starting from the "preferred" operating side. This not only facilitates cleaning and servicing, but also enables a simple and fast conversion, for example, when a slicer and interleaver operation should be converted to a different number of tracks.

These advantages also apply to the arrangement of the material rolls 17 which can all be plugged onto the common mandrel and can be removed from it from the same side— and indeed from the same side as the roll-off drives 21. It is therefore sufficient if the functional regions of the interleaver are only accessible from one side.

A pivot drive, not shown, is additionally provided for each drive arm 27. The pivot drive can, for example, comprise a piston-in-cylinder arrangement. The drive arms 27 can hereby each be pivoted into a passive state in which the friction belt 25 is out of frictional engagement with the material roll 17. This passive state can, for example, be a parked position into which the drive arms 27 are pivoted when new material rolls 17 are to be inserted.

The fact that in accordance with the invention the respective friction belt 25 of the roll-off drives 21 engages in a force-transmitting manner at the outer periphery of the material roll 17 to roll off the material web 19 has the advantage that the roll-off rate, i.e. the web length rolled off per time unit, is independent of the current diameter of the material roll 17 and thus of its degree of consumption. The above-mentioned pivot drives (not shown) can each pretension the drive arm 27 in the direction of the axis of rotation 33 of the material roll 17 with a predefined force or with a predefined torque such that the drive arm 27 is adjusted to track the diameter of the material roll 17, which decreases during operation, and the frictional engagement between the friction belt 25 and the wound material web 19 is always of the same magnitude.

A material roll 17 which is almost consumed and whose diameter is only a little larger than the diameter of the roll core 113 is shown by a dashed circle. An upper drive arm 27 and a lower drive arm 27 are shown by a dashed line to illustrate a state pivoted correspondingly far in the direction of the axis of rotation 33 of the material rolls 17.

The operation of the roll-off drives 21 depends on demands of the central control device 39. If less material or temporarily no material is required in a track, the roll-off rate of the respective track can be correspondingly changed by reducing the revolution speed of the friction belt 25 or by switching off the drive motor M. In a non-driving state with the drive motor M switched off, the frictional belt 25 of the respective drive arm 27 remains in frictional engagement with the wound material web 19; it is therefore not, for instance, pivoted out of engagement with the material roll 17 by means of the above-mentioned pivot drive (not shown). This has the advantage that the frictional belt 25 is active as a brake for the material roll 17, whereby a further rotation of the material roll 17 caused by inertia is prevented.

The removal of the material webs 19 from the material rolls 17 not only comprises the rolling off by means of the above-explained roll-off drives 21, but also the conveying of the material webs 19 into the loop store 61. For this purpose, the removal device comprises a conveying device 23 which is additionally shown schematically at the top of FIG. 1 at its center.

The conveying device 23 comprises a conveying roller 47 for each track S1 to S4, said conveying roller forming a conveying gap for the respective material web 19 together with a counter-roller 48. All of the conveying rollers 47 are seated on a common drive shaft 45, that is they are only driven together, and indeed via a common drive motor 41 which sets the common drive shaft 45 of the conveying rollers 47 into rotation via a drive belt 42.

The operation of this conveying device 23 individually per track is achieved in that a slip clutch 43 which is arranged between the conveying roller 47 and the common drive shaft 31 is associated with each conveying roller 47. The slip clutches 43 are each magnetic clutches whose switching points can be set.

The conveying device 23 is operated via the control device 39 such that the material webs 19 are each always held under tension between the respective material roll 17 and the respective conveying roller 47. During operation, the common drive shaft 45 can rotate at a constant rotational speed which is coordinated with an expected operation of the interleaver for the respective cutting program of the slicer. If the roll-off drive 21 is stopped in a track or if the roll-off rate is reduced in a track, an active intervention in the operation of the conveying device 23 is not required since a roll-off rate in a track that falls below the conveying rate of the conveying device 23 is taken up by the clutch 43 of this track without the respective material web 19 being excessively strained or even tearing.

An advantage of this concept comprises the conveying device 23 only requiring a single drive comprising a drive motor 41 and a drive belt 42 and only requiring a single common drive shaft 45 for all the tracks S1 to S4 and no design or technical control measures being necessary to implement an active operation of the conveying device 23 individually per track.

If the clutch 43 is not currently active in one of the tracks and temporarily no material is thus conveyed into the loop store 61 in this track, the conveying rate of the conveying device 23 determines the web length entering the loop store 61 per time unit in each track. Since the operation of the individual roll-off drives 21 which is controlled via the control device 39 ultimately decides whether and how much material is rolled off from the respective material roll 17 per time unit in the individual tracks, the individual conveying rates into the loop store 61 are ultimately determined by the individual roll-off rates.

The track-specific material requirement in the cutting region is determined by the control device 39 and is ensured by a corresponding track-specific control of the roll-off drives 21. The loop store 61 ensures a decoupling in each track between the sluggish material roll 17, on the one hand, and the highly dynamic output device 71, on the other hand, which, in the cycle of the cutting blade 51, has to output a web length corresponding to the length of the respective required interleaved sheet 15, in each case on short notice. Such a highly dynamic cyclic ejection of relatively long material sections would be incompatible with a pulling off of the material web 19 directly from the material roll 17.

The control device 39 therefore ensures that a web length which is sufficiently large for a disruption-free output operation of the output device 71 is available in the loop store 61 in each track at all times in that a material loop 20 which is always sufficiently large is provided in the loop store 61.

The formation and maintenance of these material loops 20 in the individual tracks is achieved by a sufficiently large "replenishment" by means of the removal device, that is by means of the roll-off drives 21 and the conveying device 23, on the one hand, and by an air circuit comprising a combined suction and blowing device 63, 65, on the other hand.

The suction side of a fan 64 belonging to this combined suction and blowing device 63, 65 is connected via a suction line 66 to a vacuum housing 68 in which a plurality of vacuum chambers 69 are formed which are separate from one another in a technical flow aspect within the housing 68. The pressure in each vacuum chamber 69 can be measured by means of sensors, not shown, and can be provided to the control device 39.

The housing 68 is bounded toward a loop region of the loop store 61 by a curved contact surface 67 in which openings are formed via which air can move from the loop region into the individual vacuum chambers 69, such as is indicated by the small arrows. The vacuum chambers 69 are each connected to the suction line 66 and thus to the suction side of the fan 64 whose pressure side is directed into the loop region, such as is indicated by the arrow in FIG. 1.

This air circuit has the effect that a designated material loop 20 is always formed and that the material web 19 contacts the contact surface 67 of the vacuum housing 68 in the designated manner. Since the material web 19 is sucked toward the contact surface 67 due to the vacuum present in the vacuum chambers 69, the contact surface 67 simultaneously serves as a brake for the material webs 19. The material webs 19 are hereby always held under a light tension, whereby the material webs 19 are prevented from compressing when the output device 71 which works in the cutting cycle pulls the material webs 19 out of the loop store 61 in a highly dynamic manner. The braking effect of the contact surface 67 or of the vacuum chambers 69 is in this respect set such that this highly dynamic removal process is not impaired.

The control device 39 can recognize by means of the mentioned pressure sensors in the vacuum chambers 69 which vacuum chamber 69 is covered by the material web 19 and which is not. A measure for the current size of the material loop 20 in the loop region of the loop store 61 can be derived from this information in a simple manner with sufficient accuracy. The material web 19 drawn as a dashed line is shown with a maximum loop size in FIG. 1. The extent of the material web 19 with a minimal loop size, in which only the uppermost vacuum chamber 69 is partly covered by the material web 19, is indicated by a dotted line.

The control 39 can activate or deactivate the individual roll-off drives 21 individually per track in accordance with the individual loop sizes determined in this manner or it can change the individual roll-off rates by a corresponding control of the motors M1 to M4 to ensure that a sufficiently large material loop 20 is present for each track at all times to maintain the above-explained decoupling between the respective track of the output device 71 and the associated material roll 17.

The output device 71 is likewise configured for an operation individually per track. For this purpose, a feed unit 73 comprises a feed roll 74 for each of the tracks S1 to S4, as will be explained in more detail in the following with reference to two possible embodiments in accordance with FIGS. 2 and 3. The feed rolls 74 have a common axis of rotation 99, wherein a separate drive motor A1, A2, A3 or A4 is provided for each feed roll 74 and cooperates via a drive belt 78 with a drive shaft 83 (cf. FIG. 2) to which the respective feed roll 74 is rotationally fixedly connected.

As FIG. 2 shows, the two feed rolls 74 for the tracks S1 and S2 are driven via a right coaxial shaft drive 79, whereas a left coaxial shaft drive 81 drives the two feed rolls 74 of the other two tracks S3 and S4. The respective inwardly disposed feed roll 74 is driven via an inwardly disposed drive shaft 83, whereas the respective outwardly disposed feed roll 74 is driven via a hollow shaft 83 surrounding the inwardly disposed drive shaft 83.

In this manner, a drive individually per track of four feed rolls 74 arranged next to one another at a common axis of rotation 99 can be implemented for the feed unit 73 of the output device 71.

An alternative design for a four-track drive comprising four individually drivable feed rolls 74 is schematically shown in FIG. 3. Two axes of rotation 91 which extend in parallel are provided here, wherein a respective two two-track units 95 are arranged next to one another at each of the two axes 91. Each two-track unit 95 comprises a feed roll 74 and a pressing roller 76 which are rotationally fixedly connected to one another and which can, for example, be formed in one piece with one another. Each feed roll 74 cooperates directly with a respective material web 19, whereas the co-rotating pressing roller 76 is provided with a freewheeling function with respect to the material web 19 in its track. The freewheeling function is implemented in that the pressing roller 76 supports a freely rotatable pressing sleeve 98 for the material web 19 via a rolling element bearing 97.

A feed roll 74 at the one axis 91 and a pressing unit comprising the pressing roller 76 and the pressing sleeve 98 at the other axis 91 therefore form a pair 98 for each of the tracks S1 to S4, said pair forming a feed gap for the respective material web 19.

Each two-track unit 95 can, for example, be rotated about the respective axis 91 via a drive belt, not shown, by means of an associated drive motor (not shown), wherein the two axes 91 are driven with an opposite rotational sense. Adjacent two-track units 95 at a common axis 91 are rotatable relative to one another. For this purpose, a respective axial extension of a pressing roller 76 engages into an end-face depression of the adjacent feed roll 74 at which the extension of the pressing roller 76 is supported in the radial direction by a rolling element bearing 96.

Due to this arrangement, a feed individually per track for four tracks S1 to S4 disposed next to one another is implemented as a particularly compact unit into which the counter-units or pressing units 76, 98 associated with the individual feed rolls 74 are integrated. A division into a feed unit, on the one hand, and into a counter-unit, on the other hand, as in the embodiment in accordance with FIGS. 1 and 2, is consequently not provided here.

As FIG. 1 shows, in the embodiment shown here, a counter-unit 75 is provided in addition to the feed unit 73 comprising the four feed rolls 74 which can be driven individually per track. The counter-unit 75 can have at least one associated pressing roller 76 for each feed roll 74, which pressing roller is supported in an elastic or a resilient manner such as is indicated schematically in FIG. 1 by the suspension 77 and is indicated schematically in FIG. 4 by a piston-in-cylinder arrangement 109 configured as a suspension.

Alternatively, the counter-unit 75 can have a plurality of counter-elements arranged distributed along an axis extending in parallel with the axis of rotation 99 of the feed rolls 74, in particular counter-elements in the form of individually resiliently supported pressing rolls or pressing rollers each having a diameter which is small with respect to the feed rolls 74. These counter-elements which are not driven form a feed gap for one of the material webs 19 with each of the feed rolls 74. Such counter-units or pressing units for output devices of interleavers are generally known so that it is not necessary to look at them in more detail.

As the representation at the bottom left in FIG. 1 shows schematically, it is a special feature of the output device 71 that the feed unit 73 and the counter-unit 75 are attached to a stationary mount 70, fastened to a machine frame 115 of the slicer, together with a cutting edge 85 which is also called cutting glasses, a molded tray or a counter-blade.

The mount 70 and the components counter-unit 75, feed unit 73 and cutting edge 85 are configured corresponding to one another such that these components can only be mounted at the mount 70, without tools, in a single order.

In this respect, the counter-unit 75 is first arranged at the mount 70. The counter-unit 75 is fixed and secured in its desired position by a subsequent attachment of the feed unit 73. The attachment of the feed unit 73 requires a combined turn-pivot movement into an end position which—as indicated by the arrow in the large representation of FIG. 1—has the consequence that, on the attachment of the feed unit 73, all the drive belts 78 of the drive motors A1 to A4 are simultaneously tensioned which were previously, in the relaxed state, placed around the drive shafts 83 of the feed rolls 74 projecting at both sides. Accordingly, the drive belts 78 are automatically relaxed on the removal of the feed unit 73.

Finally, the cutting edge 85 is attached to the mount 70. The cutting edge 85 in turn positions and secures the feed unit 73 in its desired position. A clamping device 117 comprising two clamping pins 117 which are pneumatically adjustable relative to the mount 70—as indicated by the two double arrows—positions and subsequently secures the cutting edge 85 and thus all three components counter-unit 75, feed unit 73 and cutting edge 85 at the mount 70.

The mount 70 can furthermore serve for the attachment of further devices. Thus it may e.g. be necessary in practice to set the so-called cutting gap between the cutting blade 51 and the cutting edge 85 to a specific value. In this connection, sensors such as vibration sensors can be used which can be attached to the mount 70 or integrated into the mount 70.

A simple and reliable assembly and dismantling of the three named components without tools is implemented in this manner.

A query can additionally take place by the control device 39 by means of the clamping pins 117 and it can be recognized whether a cutting edge 85 is present at all and whether—in dependence on the respective set cutting program—the correct cutting edge 85 has been mounted. When a cutting edge 85 is missing, the clamping pins 117, for example, extend further than when the correct cutting edge 85 is present—this incorrect positioning of the clamping pins 117 can be recognized by the control device 39.

As already explained above, the ejection of the material web 19 by means of the output device 71 takes place such that the front end of the material web 19 is disposed in front of the cut surface of the respective product 11 so that it can be cut off from the material web 19 by means of the cutting blade 51 together with the slice 13 to be cut off next and can thus form an interleaved sheet 15.

To influence the front end of the material web 19 in this sense, a vacuum is generated by means of an air flow in the region between the material web 19 and the cut surface of the product 11 and has the effect that the front end of the material web 19 is placed against the cut surface. This concept is generally known. The air flow can e.g. be generated in that compressed air is ejected via a gap extending transversely to the material web 19 or via a plurality of openings arranged distributed in the transverse direction.

As FIG. 4 shows, in accordance with the invention, an individually variable air flow 87 is generated for each of the tracks S1 to S4 via the feed unit 73 such that the free ends of the individual material webs 19 can be influenced individually per track. The individual air flows 87 can be varied individually per track in a time regard and with respect to their strength.

This is achieved in that, for each track S1 to S4, a plurality of outlet openings are arranged distributed transversely to the respective material web 19 in the front region of the feed unit 73 above the outlet gap for the individual material webs 19 which is formed by the feed unit 73 and by the counter-unit 75.

Each outlet opening belongs to an outlet passage 101 formed in the feed unit 73, with all the outlet passages 101 starting from a common distributor space 103 which is in communication with a compressed air source, not shown, via an inlet passage 105 and via a supply line 107. Each supply line 107 is provided with a controllable valve 108. The valves 108 can be controlled individually per track via an adjustment device 89.

The time behavior and the strength of the respective air flow 87 can hereby be varied for each of the tracks S1 to S4 independently of the respective other tracks.

The rail 72 also shown in FIG. 4 is a replaceable wear part which preferably comprises plastic and which serves as a cutting edge which cooperates with the cutting blade 51 on the cutting through of the individual material webs 19.

The interleaver can be configured to automatically connect consecutive material webs 19 to one another in each of the individual tracks S1 to S4. In FIG. 1, possible positions are schematically shown at which a connection device V integrated into the interleaver can be arranged.

A change device which is configured to automatically replace a respective used material roll 17 with a material roll 17 to be used is not shown in FIG. 1. The change device can be arranged outside the interleaver or can at least partly be integrated into the interleaver. A separate change device can be provided for each of the tracks S1 to S4. Alternatively, a plurality of tracks or all the tracks can have a common change device.

A multitrack design of the interleaver can also be implemented in that a common rotatably supported material roll 17 is provided for a plurality of tracks S, with a device T for dividing the material web 19 into a plurality of individual material webs 19 being provided for the material web 19 of this common material roll 17. A possible position at which such a division device T integrated into the interleaver can be arranged is schematically indicated in FIG. 1. Only one roll-off drive 21 is then provided for these tracks S, i.e. for the respective material roll 17.

In this respect, it is e.g. possible that a four-track interleaver is implemented in that two material rolls 17 are provided with which a roll-off drive 21 and a division device T are respectively associated, i.e. from whose material web 19 a respective two individual material webs 19 arise such that four individual material webs 19 move to the devices arranged downstream of the division devices T, such as in the case that a separate material roll 17, and no division device T, is provided for each track S.

Different combinations are conceivable. For example, in a four-track interleaver, a respective separate material roll can e.g. be provided for two tracks and a common material roll and a division device can be provided for two further tracks.

A handling of the individual material webs 19 individually per track in a continuous manner is consequently possible in the interleaver in accordance with the invention such that the interleaver can be operated by means of the control device 39 in dependence on the cutting process in such a manner that the interleaver operation on individual tracks can be perfectly coordinated with the cutting operation on individual tracks.

It must also be mentioned for reasons of completeness that an interleaver configured on one track or temporarily operated on one track can have a roll-off drive, such as is respectively described above for one of the tracks S1 to S4.

With the exception of the differences described below, the embodiments shown in FIGS. 5 and 6 each correspond to the embodiment of FIG. 1. Mutually corresponding components for which the same reference numerals are used are therefore not explained in more detail. In this respect, reference is made to the statements on FIG. 1 and—where applicable—also to the statements on FIGS. 2, 3 and 4.

FIGS. 5 and 6 each show a possibility of detecting the reaching of a predefined maximum loop size in the loop store 61, and indeed in each case by means of a sensor 159, also called a loop detector, provided for the respective track.

Such a sensor 159 is provided for each track. The sensors 159 are e.g. arranged next to one another in the transverse direction Q and can be adjustable in the transverse direction, in particular for track alignment.

Reference is additionally made to the corresponding statements in the introductory part on this loop detection or loop size determination.

In accordance with FIG. 5, the sensor 159 comprises a measurement space which is open toward the contact surface 67 of the vacuum chamber 69 and for this purpose, for example, has a measurement opening which can alternatively be formed by one of the openings formed in the contact surface 67. A vacuum source 157, e.g. in the form of a vacuum pump, and a measurement device configured as a manometer 161 are connected to the measurement space. The manometer 161 communicates with the control 39.

If the loop 20 reaches a specific size in the loop store 61, the measurement opening of the sensor 159 which is in this respect active as the sensitive part of the sensor 159 is at least partly closed in accordance with FIG. 5 and the sensitive part of the sensor 159 which e.g. works capacitively is contacted in accordance with FIG. 6, and indeed by the respective material web 19 which is sucked toward the contact surface 67 and which forms the loop 20.

In accordance with FIG. 5, the pressure is then reduced in the measurement space such that this pressure difference or the detection of the pressure difference can be communicated to the control 39. In accordance with FIG. 6, the sensor 159 likewise communicates the response of the sensitive part of the sensor 159 with respect to the material web 19 to the control 39.

The manometer 161 and/or the vacuum source 157 can also be integrated into the sensor 159 in the embodiment in accordance with FIG. 6.

In FIG. 5 and FIG. 6, a drive motor 151 for the cutting blade 51 and a deflection roller 153 arranged downstream of the loop store 161 are respectively shown for each of the material webs 19.

REFERENCE NUMERAL LIST 11 product
13 slice
15 interleaved sheet
17 material roll
19 material web
20 loop
21 roll-off drive
23 conveying device
24 drive belt
25 friction belt, drive member
27 drive arm
28 pivot axis
29 axis of rotation of the drive shafts
30 drive roller
31 drive shaft
32 deflection roller
33 axis of rotation of the material rolls
35 upper coaxial shaft drive
37 lower coaxial shaft drive
39 control device
41 drive of the conveying device
42 drive belt
43 clutch
45 drive shaft
46 product holder
47 conveying roller
48 counter-roller
49 product feed
50 cutting plane
51 cutting blade
53 product support
55 portioning belt
61 loop store
63 suction device, brake
64 fan
65 blowing device
66 suction line
67 contact surface
68 housing
69 vacuum chamber
70 mount
71 output device
72 rail
73 feed unit
74 feed roll
75 counter-unit
76 pressing roller
77 suspension
78 drive belt
79 right coaxial shaft drive
81 left coaxial shaft drive
83 drive shaft
85 cutting edge
87 compressed air flow
89 adjustment device
91 common axis
93 pair
95 two-track unit
96 rolling element bearing
97 rolling element bearing
98 pressing sleeve
99 common axis of rotation
101 outlet passage
103 distributor space
105 inlet passage
107 supply line
108 valve
109 piston-in-cylinder arrangement
111 shaft
113 roll core
115 machine frame
117 clamping pin
151 drive motor for the cutting blade
153 deflection roller
155 pivot drive
157 vacuum source
159 sensor
161 measurement device

The invention claimed is:

1. An apparatus for a single-track or multitrack provision of web-like interleaved sheet material at a cutting region in which products supplied on one track or on multiple tracks are cut into slices and interleaved sheets are introduced which are cut off from the provided interleaved sheet material in the cutting region, the apparatus comprising:
a material store;
a removal device for a removal of a material web from the material store;
a loop store defining a space for the removed material web to form a loop, the loop store located between the material store and the cutting region;

at least one vacuum chamber, the at least one vacuum chamber having at least one opening located adjacent a path of the loop; and a device for determining a size of the loop formed in the loop store based on the detection of a pressure drop within the at least one vacuum chamber when the opening is at least partially covered by the loop.

2. An apparatus for a single-track or multitrack provision of web-like interleaved sheet material at a cutting region in which products supplied on one track or on multiple tracks are cut into slices and interleaved sheets are introduced which are cut off from the provided interleaved sheet material in the cutting region, the apparatus comprising:

a material store;

a removal device for a removal of a material web from the material store;

a loop store defining a space for the removed material web to form a loop, the loop store located between the material store and the cutting region;

a contact surface having at least a portion thereof that is air permeable, the contact surface at least partially bounding the loop store and at least partially covered by the loop that contacts the contact surface; and a device for determining a size of the loop formed in the loop store, the device detecting changes in at least one of a pressure differential and a flow condition, the pressure differential being a difference in pressure between a first side of the contact surface and a second side of the contact surface, the flow condition being a change of the flow of air through the air permeable portion of the contact surface, wherein the changes in the pressure differential and/or the flow condition represent a varying influence of the material loop on the air permeable portion of the contact surface that is provided as a measure for the loop size.

3. An apparatus in accordance with claim 2, wherein the loop store comprises a suction device for the material loop which acts on the material loop at least in a region at the outgoing side.

4. An apparatus in accordance with claim 2, wherein the loop store comprises a blowing device for the material loop which acts on the material loop.

5. An apparatus in accordance with claim 2, wherein a suction device acts on an outer side of the material loop and a blowing device acts on an inner side of the material loop or vice versa.

6. An apparatus in accordance with claim 5, wherein the suction device and the blowing device belong to a common air circuit.

7. An apparatus in accordance with claim 6, wherein the air circuit is controllable by an internal or external control device in dependence on the loop size.

8. An apparatus in accordance with claim 5, wherein a fan is provided whose suction side belongs to the suction device and whose pressure side belongs to the blowing device.

9. An apparatus in accordance with claim 2, wherein the air permeable portion of the contact surface bounds at least one vacuum chamber to which a suction device is connected or which belongs to a suction device.

10. An apparatus in accordance with claim 2, wherein the air permeable portion of the contact surface is convexly curved or has an arcuate contour.

11. An apparatus in accordance with claim 2, wherein a braking effect of the air permeable portion of the contact surface for the material web is settable and/or controllable by means of a suction device, by means of a blowing device or by means of an air circuit.

12. An apparatus in accordance with claim 2, wherein the web length entering the loop store per time unit is controllable by an internal or external control device in dependence on the loop size.

13. An apparatus in accordance with claim 12, wherein the removal device is controllable by the control device in dependence on the loop size.

14. An apparatus in accordance with claim 2, wherein the removal device is controllable such that the web length entering the loop store per time unit is continuously variable in dependence on the loop size.

15. An apparatus in accordance with claim 2, wherein the varying influence of the material loop on a suction device is provided as a measure for the loop size.

16. An apparatus in accordance with claim 2, wherein the result of a position determination of the material loop is provided as a measure for the loop size.

17. An apparatus for a single-track or multitrack slicing of food products having a product feed which supplies products to be sliced on one track or on multiple tracks to a cutting region in which a cutting blade moves in a rotating and/or revolving manner to cut the supplied products into slices, and having an apparatus for the provision of web-like interleaved sheet material at the cutting region in which the products supplied are cut into said slices and interleaved sheets are introduced which are cut off from the provided interleaved sheet material in the cutting region, said apparatus comprising:

a material store;

a removal device for a removal of a material web from the material store;

a loop store defining a space for the removed material web to form a loop, the loop store located between the material store and the cutting region;

at least one vacuum chamber, the at least one vacuum chamber having at least one opening located adjacent a path of the loop; and a device for determining a size of the loop formed in the loop store based on the detection of a pressure drop within the at least one vacuum chamber when the opening is at least partially covered by the loop.

18. An apparatus in accordance with claim 17, wherein a common control device is provided which is configured to coordinate the slicing of the products and the provision of the interleaved sheet material.

19. An apparatus for a single-track or multitrack slicing of food products having a product feed which supplies products to be sliced on one track or on multiple tracks to a cutting region in which a cutting blade moves in a rotating and/or revolving manner to cut the supplied products into slices, and having an apparatus for the provision of web-like interleaved sheet material at the cutting region in which the products supplied are cut into said slices and interleaved sheets are introduced which are cut off from the provided interleaved sheet material in the cutting region, said apparatus comprising:

a material store;

a removal device for a removal of a material web from the material store;

a loop store defining a space for the removed material web to form a loop, the loop store located between the material store and the cutting region;

a contact surface having at least a portion thereof that is air permeable, the contact surface at least partially bounding the loop store and at least partially covered by the loop that contacts the contact surface; and a device for determining a size of the loop formed in the loop store, the device detecting changes in at least one of a pressure differential and a flow condition, the pressure differential being a difference in pressure between a first side of the contact surface and a second side of the contact surface, the flow condition being a change of the flow of air through the air permeable portion of the contact surface, wherein the changes in the pressure differential and/or the flow condition represent a varying influence of the material loop on the air permeable portion of the contact surface that is provided as a measure for the loop size.

20. An apparatus in accordance with claim 19, wherein a common control device is provided which is configured to coordinate the slicing of the products and the provision of the interleaved sheet material.

\* \* \* \* \*